United States Patent [19]
Ryerson

[11] 3,775,181
[45] Nov. 27, 1973

[54] LITHIUM STORAGE CELLS WITH A FUSED ELECTROLYTE

[75] Inventor: Joseph L. Ryerson, Holland Patent, N.Y.

[73] Assignee: Broomfield Ryerson Research Corporation, Holland Patent, N.Y.

[22] Filed: Aug. 12, 1971

[21] Appl. No.: 171,242

[52] U.S. Cl. .............................................. 136/6 LF
[51] Int. Cl. ........................................... H01m 35/00
[58] Field of Search ................................. 136/6, 83

[56] References Cited
UNITED STATES PATENTS

| | | | |
|---|---|---|---|
| 3,488,221 | 1/1970 | Shimotake et al. | 136/6 |
| 3,245,836 | 4/1966 | Agruss | 136/83 R |
| 3,238,437 | 3/1966 | Foster et al. | 136/83 R |
| 3,214,296 | 10/1965 | Smotko | 136/6 |
| 3,531,324 | 9/1970 | Fischer et al. | 136/6 |
| 3,419,432 | 12/1968 | Hesson | 136/83 R |
| 3,666,560 | 5/1972 | Cairns et al. | 136/6 |
| 3,374,120 | 3/1968 | Lawson | 136/83 R |
| 3,554,806 | 1/1971 | Greenberg et al. | 136/6 |

Primary Examiner—A. B. Curtis
Assistant Examiner—C. F. LeFevour
Attorney—Clarence A. O'Brien and Harvey B. Jacobson

[57] ABSTRACT

Sealed, lightweight, reversible E.M.F. cells utilizing a bottom layer of molten bismuth catholyte, a topmost layer of molten lithium anolyte and a two layer interfacing fused salt electrolytic system located between the catholyte and the anolyte layers, the said electrolytic system comprising a mixture of fused potassium chloride and bismuth chloride in juxtaposition to the molten bismuth catholyte and a lithium halide eutectic comprising preferably approximately 80% KCL plus 20% LiCl in juxtaposition to the molten anolyte material. The components are contained in a hermetically sealed impervious container and the anolyte and catholyte are respectively provided with anode and cathode terminals immersed therein. The said components are arranged in layers, with those having a lower specific gravity floating upon those having a higher specific gravity.

9 Claims, 3 Drawing Figures

PATENTED NOV 27 1973

3,775,181

Joseph L. Ryerson
INVENTOR.

BY Clarence A. O'Brien
and Harvey B. Jacobson
Attorneys

LITHIUM STORAGE CELLS WITH A FUSED ELECTROLYTE

This invention pertains to lithium cells, having molten metal electrodes and a fused salt electrolyte system. Reversible E.M.F. cells using solid electrodes with electrolytes in aqueous solution are in widespread use as accumulators of electrical energy or storage cells. The energy stored in these cells per unit system weight is approximately only 2 percent of the available energy of an equal weight of hydrocarbon fuel. This relative inefficiency of storage cells of the prior art has favored the use of hydrocarbon fueled heat engines for vehicular propulsion.

The oxidation-reduction reactions which are the basis for both the conventional-type storage cells as well as for primary E.M.F. cells do not inherently limit the electrical energy storage capacity. Their relative inefficiency is due to such factors as the use of water as a solvent for the reactants which consumes weight and space and is also responsible for undesirable secondary electrode reactions which limit current densities and require the use of ancillary electrode materials. Moreover, solid electrodes which must be formed electrolytically in the process of accumulating the stored energy require special features to prevent loss of cell life and efficiency, as well as to provide resistance to vibration and shock encountered in vehicular applications.

The use of fused salts rather than their aqueous solutions eliminates secondary electrode reactions and substantially reduces the weight of the reactants due to the elimination of water. The use of molten metal electrodes further reduces the weight due to elimination of special structural features required to fasten the massive solid electrodes which are used in aqueous electrolyte systems securely. Shock and vibration will cause transient deformation of liquid components. These transient deformations can be reduced by the baffling effect of the electrolytically and chemically inert connecting electrodes immersed in the fused metal anodes and cathodes. These electrodes additionally provide a continuing path to the external cell terminals.

The prior art discloses two basic modes of operation of fused salt electrolyte cells. In one mode the metal of the anode releases positive ions into an electrolyte containing this ion. The electrolyte is located between the anode and cathode metal and its positive anode metal ions combine with the negative ions of the cathode metal. This results in the formation of an intermetallic compound in which the anode metal has a positive electro-valence and the cathode metal assumes a negative electrovalence. This mode of operation is only possible in those instances in which inter-metallic compounds exist for the metals employed. This mode of operation has been uder investigation for some time and is described in recent literature. For instance, see R. O. Weaver, Stanley W. Smith, Norman L. Willman "The Sodium/Tin Liquid Metal Cell", *Journal of the Electrochemical Society*, Vol. 109, No. 8, Aug. 1962, pp. 653–657.

Another metal system is the lithium/bismuth cell. An example of this is disclosed in M. W. Foster et al, "Regeneration of E.M.F. Cells Having Molten Metal Electrodes and a Fused Salt Electrolyte", U. S. Pat. No. 3,283,437, issued Mar. 1, 1966. The system disclosed therein follows the rule that the cathode must be a metal which is lower in the electromotive force series than the anode metal and at the same time must have a specific gravity greater than that of the anode. In addition, both metals should be molten throughout approximately the same temperature range. Bismuth is preferred as the cathode and lithium is preferred as the anode. While other metals may be used lithium and bismuth not only suit the above requirements, but also generate a high E.M.F. and unusually high current density.

The fused salt electrolyte must be of a specific gravity intermediate between that of the anode and cathode metal in order to separate the two electrodes. The electrolyte must contain a cation of the more electropositive metal where the electrodes are lithium and bismuth for example, the electrolyte may be lithium chloride. Preferably potassium chloride is added to the lithium chloride to form the eutectic in order to lower the melting point of the electrolyte.

The second mode of operation of cells having fused salt electrolytes makes use of the more normal electropositive valence of the cathode metal in this type of cell, the operation is similar to that which occurs in the zinc/copper Daniel cell. The anode is in contact with a salt containing its positive ions and the cathode is in contact with a salt containing its positive ions. Each salt contains the same negative ion. This mode differs from the previous one primarily in the use of two interfacing electrolytes, rather than one.

The E.M.F. cells of the prior art having molten metal electrodes and a fused electrolyte have been characterized, due to their construction by relatively high weight in terms of energy producing capacity and have consequently been most unsuitable for mobile power source applications. Heretofore, their utility has been limited to fixed installations.

Accordingly, it is an object of this invention to provide a liquid metal E.M.F. cell power system for such uses as vehicular propulsion.

It is another object of this invention to eliminate the requirement of massive solid electrodes and to thereby eliminate the special structural features required to support such massive solid electrodes.

Another object of this invention is to reduce transient deformation of liquid components of the cell.

Another object of this invention is to eliminate the excess weight heretofore inherent in liquid metal E.M.F. cells.

A further object is to reduce undesirable heat losses from the system while providing efficient dissipation of excess heat produced during peak load conditions.

Another object is to retain sufficient heat in the cell to maintain its operating temperature when it is not delivering power.

A still further object is to provide a means for starting the operation of a cold cell to initially fuse the components.

It is also an object of this invention to provide for recharging and regeneration of the used cells.

Still further objects of this invention are to reduce the power requirements for maintenance of operating temperature, to provide a liquid metal electrolyte capable of operating at relatively low temperatures, to provide a power source which in terms of energy obtainable per unit weight of system is commensurate with the energy per pound derived from the combustion of hydrocarbon fuel and to provide a power source with space requirements therefor being similar to or less than the space required for hydrocarbon fuel power sources e.g. internal combustion engines and associated fuel storage means required to produce an equivalent amount of energy.

Further objects and aspects of the invention will become apparent in the following discussion.

The present invention may be better understood by reference to the following detailed description and the drawings in which.

Figure 2:
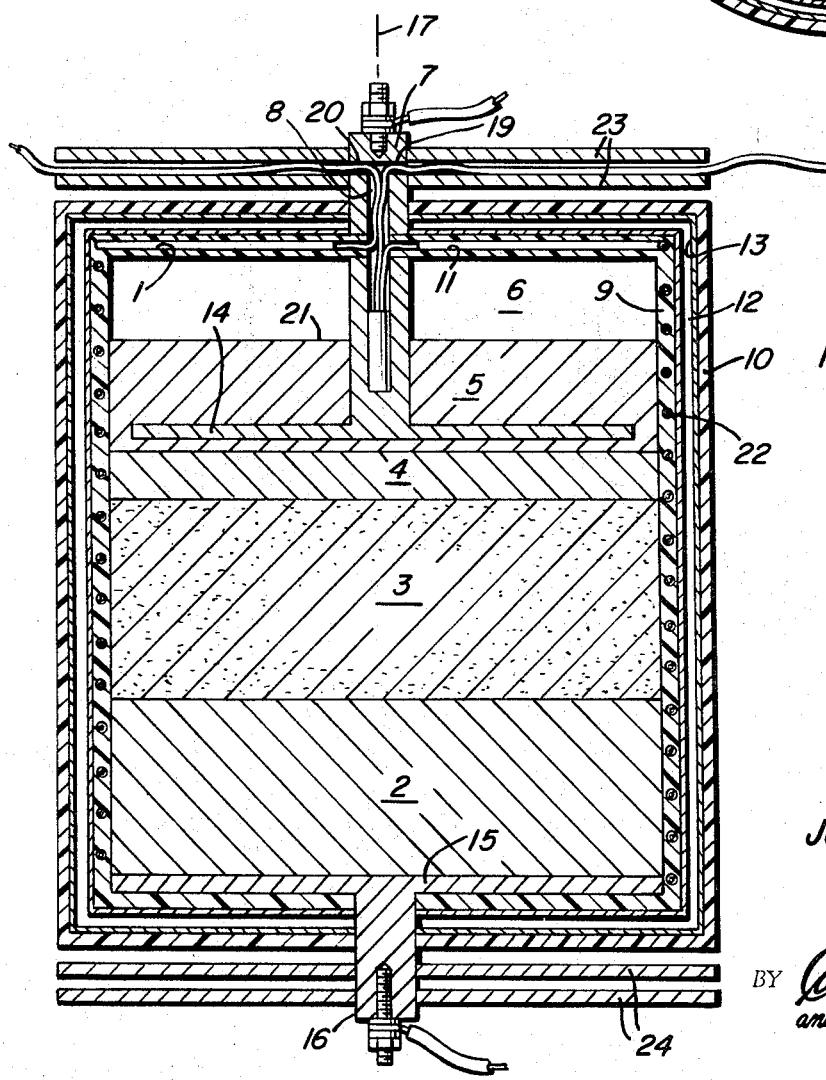
FIG. 2 is an enlarged sectional view of the cell depicted in FIG. 1 taken substantially along section line 2—2 in FIG. 1.

Referring to the drawings, a double walled container is illustrated in FIG. 2 having an inner wall 9 and an outer wall 10 of a material uneffected by the cell components in the 200° to 300° C. range. The walls are separated by an evacuated space 12 and silvered on surfaces 13 to provide Dewar-type thermal insulation. Helical heating elements 22 are embedded in wall 9 of the inner container and wound about the container axis 17. The cross-sectional ends of said helical heating elements are shown in FIG. 2, channels 1 and 11 in the top of the inner container connect cavity 8 in the interior of anode terminal 7. Cavity 8 contains a thermostatic element (not shown) and connects with openings 19 and 20 which carry conducting leads to the thermostat and heating elements 22.

Anode terminal 7 connects to anode electrode 14. For the attainment of minimum weight 7 and 14, as well as cathode terminal 16 and cathode electrode 15 may be fabricated from aluminum or equivalent lightweight conducting metals and alloys and plated with electrolytically pure iron or nickel to resist the corrosive action of the cell materials.

Anode 14 is immersed in molten lithium 5 in contact with one of the inert gases such as argon in space 6. As the cell discharges, lithium level 21 will drop to the upper surface of anode 14. Lithium reacts chemically with both nitrogen and oxygen. The cell must be permanently sealed to prevent evaporation of lithium and loss of gas. Pressures will vary from 1 to 2 atmospheres as the lithium level rises with charging and falls as the cell discharges.

Reference numeral 4 represents a lithium halide eutectic fusing between 200° and 400° C. In a preferred embodiment of this invention the eutectic may be composed of 78.6% KCl, and 21.4% LiCl which melts at 361° C. Data indicates that a lithium chloride, lithium iodide eutectic exists at 240° C. Its low density will allow it to float on bismuth chloride or it may be contained in a thin (approximately 2 mm)inert matrix of asbestos fibre or filter ceramic. Its function is equivalent to that of an ion permeable membrane to provide positive lithium ions to bismuth chloride 3. The potassium chloride has the function of reducing the melting point as it is converted into lithium chloride during discharge.

The bismuth chloride 3 is in contact with the bismuth metal 2. This metal rests on cathode 15. In the discharged condition only a minimal film of bismuth exists at 3.

During discharge lithium chloride is formed at the top of the bismuth chloride and progresses downward as bismuth is deposited on the cathode. The salt added to the bismuth chloride need not be limited to potassium chloride. A salt such as lithium iodide may be added and would also function to reduce the melting point of the lithium chloride formed during discharge.

In accordance with this invention, the interposition of a molten bismuth chloride electrolyte layer 3 between the bismuth catholyte layer 2 and the fused electrolyte salt layers 4 comprising lithium halide eutectic (e.g. 78.6% of KCl and 21.4% LiCl) instead of a single salt fused electrolyte such as disclosed by Foster has the effect of approximately tripling the power capacity of the cell of this invention as compared to the power capacity of the Foster cell per unit weight of the respective E.M.F. cell contents.

It is this combination of cell components and the favorable energy to weight ratio together with the novel construction of this cell which makes it possible to use this cell as an efficient power source for vehicular propulsion.

In this cell electrical energy is derived from the free energies of the following reactions:

1. $3Li + BiCl_3 \rightarrow 3LiCl + Bi$. The measured free energy of this reaction is 336 watt-hours per pound of reactants and is the equivalent of a terminal open circuit voltage of 3.08. This is contrasted with the alternative mode of operation previously described in which the compound lithium bismuth is formed at the cathode.

2. $Li + Bi \rightarrow LiBi$. This reaction produces a terminal voltage of 1.0 which is the equivalent of the conversion of 57-watt hours of free energy per pound of reactants.

Gravity causes the cell liquids to remain in relative positions indicated due to the respective specific gravities of the components.

The energy per pound of system including container, electrolyte, etc. would of course be less than that obtainable from a pound of reactants.

The energy derived from a one pound system based on conversion of bismuth chloride to lithium chloride including added inert salts, container, etc. is estimated at 68% of the energy derived from the reactants or 228 watt-hours per pound of system which is the equivalent of 76 ampere-hours per pound. Systems larger than one pound could increase the energy per pound due to the disproportionately lower increase of container weight with increase of contents.

The estimated energy storage capacity per pound of system is 228 watt-hours and is commensurate with the available energy per pound derived from the oxidation of hydrocarbon fuels. The total heat derived from a fuel such as hexane which is comparable to gasoline is 18,600 BTU per pound. An internal combustion engine or some other form of heat engine may be expected to operate at an average thermal efficiency of about 10%. The available energy from 10% conversion of one pound of this fuel for use for work would be in the neighborhood of 545 watt-hours per pound. The energy storage capability of the cell system comprising this invention would be 42% of the foregoing amount, an appreciable fraction. On this basis the available energy of 20 gallons of gasoline having a weight of about 120 pounds could be provided by 292 one-pound cells.

The volume of each one-pound cell of this invention is estimated at 100 cm. A U.S. gallon as a unit of measure contains roughly 3,800 cm³. The 292 cells would therefore occupy 7.5 gallons of space.

The peak currents obtainable with the cell of this invention are virtually short circuit currents, which are primarily limited by the internal cell resistances. The fused cell electrolytes are the primary contributors to internal resistance due to the relatively high resistivities of these materials compared to those of the metal electrodes. In the case of the cell described here, the resistivity of the $BiCl_3$ at the operating temperature range preferred in this invention is about 2.5 ohms per cubic centimeter. In order to provide a cell with an internal resistance of about 0.05 ohms the ratio of the thickness of the $BiCl_3$ in the charged condition to its conducting surface should be 0.02. With this ratio fixed for a 0.05 ohm cell the thickness of the bismuth chloride becomes the controlling dimension for the assignment of all other dimensions and quantities of materials for the cell.

Figure 1:
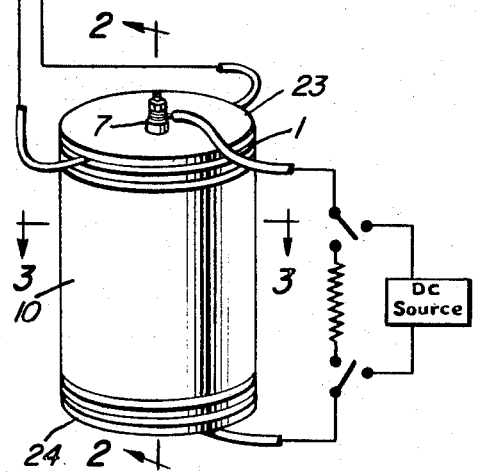
FIG. 1 is a perspective view of a cell which is the subject of this invention.
Figure 3:
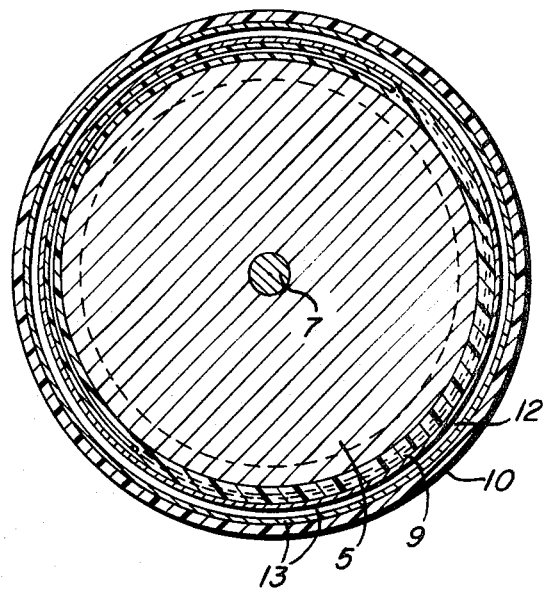
FIG. 3 is an enlarged sectional view of the cell depicted in FIG. 1 taken substantially along section line 3—3 in FIG. 1.

In addition, a 2 to 1 compression ratio may be assigned for the inert gas by setting the gap between the charged level of lithium equal to a thickness of lithium. The thickness of layers of cell material in FIG. 1 are not scaled to conform with the choice of parameters noted above. Cells having 0.05 ohms of internal resistance may be scaled for a variety of energy storage capacities without imposing tolerances and material dimensions such as to require developing any special precision manufacturing procedures.

A cell weighing one pound and having an internal resistance of 0.05 ohms will have a layer of bismuth chloride with a thickness of 1.55 cm. It will have a cross-sectional area of 50 square centimeters and will deliver a peak load of 30 amperes (0.6 amperes per square centimeter) at 1.5 volts. For this configuration each cell can deliver a peak power of 45 watts.

If a cell is desired capable of delivering 300 watts peak power at 1.5 volts, it must have an internal resistance of 0.075 ohms. This requires the area be 333.3 times the thickness of bismuth chloride. For a one pound cell the volume of bismuth chloride must remain 87.5 cm³, as before, (50×1.55). This requires a bismuth chloride thickness of 0.51 cm. The cell area becomes 170 square centimeters, or a diameter for a cylindrical container of 14.5 cm (5.7 inches). The peak current delivered by each cell will be 200 amperes or 1.18 amperes per square centimeter.

For the foregoing scaling of the cell, a system comprising 292 one-pound cells will be capable of delivering approximately 87.6 kilowatts or an equivalent of 118 horsepower.

In addition the system must be provided with means to remove heat from the cells during peak load conditions, which in the case of a one pound cell rated at 300 watts will be 300 watts. It is estimated that under normal operating conditions the demand for peak power would occur only for about 10% of the time the cell is in operation. During the remaining 90% of its operating period it could be expected to operate at about 15% of peak power.

At 15% of peak power delivered (45 watts) the terminal voltage of the cell will be 2.74, and the terminal current 15.5 amperes. Under these conditions, the internal cell loss will be 15 watts, or 6% of peak load losses. Based on the assumed duty cycle of 10% of the operating time at 300 watts internal loss, 90% at 15 watts internal loss, the average rate of internal loss becomes 31.35 watts.

In order to determine the amount of cooling capacity required, the above internal loss of 31.35 watts must be viewed in the light of the following three heat transfer conditions which must be satisfied by the cell system:

a. Heat must be applied to the cold cell to fuse the components;
b. Heat must be retained in the cell to maintain its operating temperature when it is not delivering power;
c. Heat generated within the cell by internal electrical losses during operation under average load conditions must be removed from the cell in order to prevent excessive rises in operating temperature.

The known latent heats of fusion and specific heats of the cell component require that 41 watt-hours of heat be applied to the interior of a one pound cell to raise its temperature from the solid state at 20° C. to a fused operating temperature of 300° C. Stated a little differently 410 watts must be delivered by heating elements 22 of FIG. 1 for a period of approximately 6 minutes to accomplish fusion. Alternatively heat may be passed into the cell by conduction through the electrical terminals.

Fusion of the cell may be accomplished when it is placed in service. The operating temperature should then be maintained by applying its normal open circuit terminal voltage to heating coil 22 in series with its thermostatic control. For this purpose the coil should deliver about 25 watts.

Neglecting losses through its electrical terminals the loss through the Dewar type enclosure should approximate 2% for a 1 pound, 300 watt cell of surface area 375 sq. centimeters and with the cell delivering no power, losses will be approximately 2 watts of heat loss. For this condition the heating circuit will be in the on position for 30 seconds out of each 5 minute period. It is assumed that the cells will normally be formed part of a battery system enclosed by insulating material. This will reduce the temperature radiant through the electrical terminals such as only a small end loss will occur due to heat conduction.

For the purpose of removing heat from the cell while operating under load, heat-conducting fins of a low density metal such as aluminum having the same surface area as the outside cross-sectional area of the cell are attached to and concentric with the terminals. These are shown as 23 and 24 in FIG. 1. In the 300-watt cell the terminals 7 and 16 are sized at 1 centimeter diameter aluminum to carry 200 amperes with negligible heat temperature rise, with a temperature gradient of 96° C. over an assumed one centimeter terminal length through the container wall will produce a 150 watt rate of thermal loss at each radiator 23 and 24.

This temperature gradient must be produced by forcing air into the battery enclosure parallel to the surface of the radiator. Air at atmospheric pressure is assumed to enter the battery case at 20° C. and leave at the radiator surface temperature of 204° C. This will require an airflow of 21 cubic feet per minute for each cell when operating at peak power of 300 watts. For average operating conditions an air flow of approximately 2.1 cubic feet per minute would be sufficient to provide adequate cooling, and for the cell at no-load, no air-flow is required. The power required to drive air at this rate through the radiator space for a single cell is estimated at 5 watts. At this rate per cell a battery of 292 cells would require air at the rate of 6,132 cubic feet per minute at peak load, requiring approximately a 2-horsepower propeller fan engaged when full load current is approached or thermostically controlled by the battery enclosure temperature.

Charging of the cell would require the passage of current through the cell in direction opposite to the load current. Power loss problems at a 200 ampere charging rate would be the same as those encountered at peak power delivery and would require 23 minutes of charging time at this rate. The internal resistance of the cell would be relatively low (about 10%) of charged value and the energy lost in charging would be roughly at an average loss rate of 150 watts for 23 minutes or an energy loss of 57 watt-hours, representing 25% of the stored power of 228 watt hours.

What is claimed as new is as follows:

1. A regeneratable, storage type E.M.F. cell comprising:
   a. a hermetically sealed thermally insulated container having an inert gas atmosphere and manufactured from a material resistant to the corrosive action of the components therein contained (as claimed hereinbelow) throughout a temperature range of up to and including 400° C.;
   b. a bismuth catholyte layer disposed on bottom of said container and in intimate contact with cathode conductive terminals immersed therein, the cathode terminal material being a lightweight conducting metal plated with electrolytically pure metal selected from the group consisting of iron and nickel to resist corrosive action of the cell materials;
   c. a first salt layer functioning as a cathode comprising a mixture of a halide of bismuth and halide salts of alkali metals, said salts being present in proportions such that the melting point of the mixture is between 200° and 400° C., said first layer being disposed immediately above and forming an interface with the bismuth catholyte layer of (b) above;
   d. a second salt functioning as an electrolyte layer disposed immediately above the first layer of (c) above, and forming an interface therewith, the said second layer comprising a lithium halide eutectic fusing between 200° and 400° C., comprising a mixture of a lithium halide with a halide salt of an alkali metal;
   e. a lithium anolyte layer in intimate contact with the anode conductive terminals immersed therein said anode terminal material being a lightweight conducting metal plated with electrolytically pure metal selected from the group consisting of iron and nickel to resist corrosive action of the cell materials, said layer being disposed immediately above and forming an interface with second electrolyte layer (d); and
   f. an evacuated space filled with inert gaseous material.

2. An E.M.F. cell as claimed in claim 1 above wherein said cell is provided with an inner container and an outer container separated from said inner container by an evacuated space, the facing walls of said inner and outer container being silvered to provide Dewar type thermal insulation wherein helical heating elements are embedded in the wall of the inner container and wound about the container axis and wherein channels in the top of the inner container connect with a cavity in the interior of the anode terminal said cavity adapted to contain a thermostatic element.

3. An E.M.F. cell as claimed in claim 1, wherein the material from which the said container is constructed is a silicone resin.

4. An E.M.F. cell as claimed in claim 1, wherein the halogen is selected from the group consisting of iodide, and chlorine, and wherein the alkali metal is potassium.

5. An E.M.F. cell as claimed in claim 1, wherein the inert gaseous material is argon.

6. An E.M.F. cell as claimed in claim 1 wherein the layer lithium halide eutectic mixture of clause (d) is contained within an inert lithium ion-permeable matrix.

7. An E.M.F. cell as claimed in claim 1 provided with means for removing excess heat from the system.

8. A power source comprising a regeneratable storage type E.M.F. system having a plurality of electrically interconnected E.M.F. cells of claim 1, the total power capacity of said power source being regulated by the individual power capacity of each of the cells and the number of individual cells utilized.

9. An E.M.F. cell as claimed in claim 1 wherein the halide of bismuth in said first salt layer is bismuth chloride and said second salt electrolyte layer is a lithium chloride-potassium chloride eutectic.

* * * * *